UNITED STATES PATENT OFFICE.

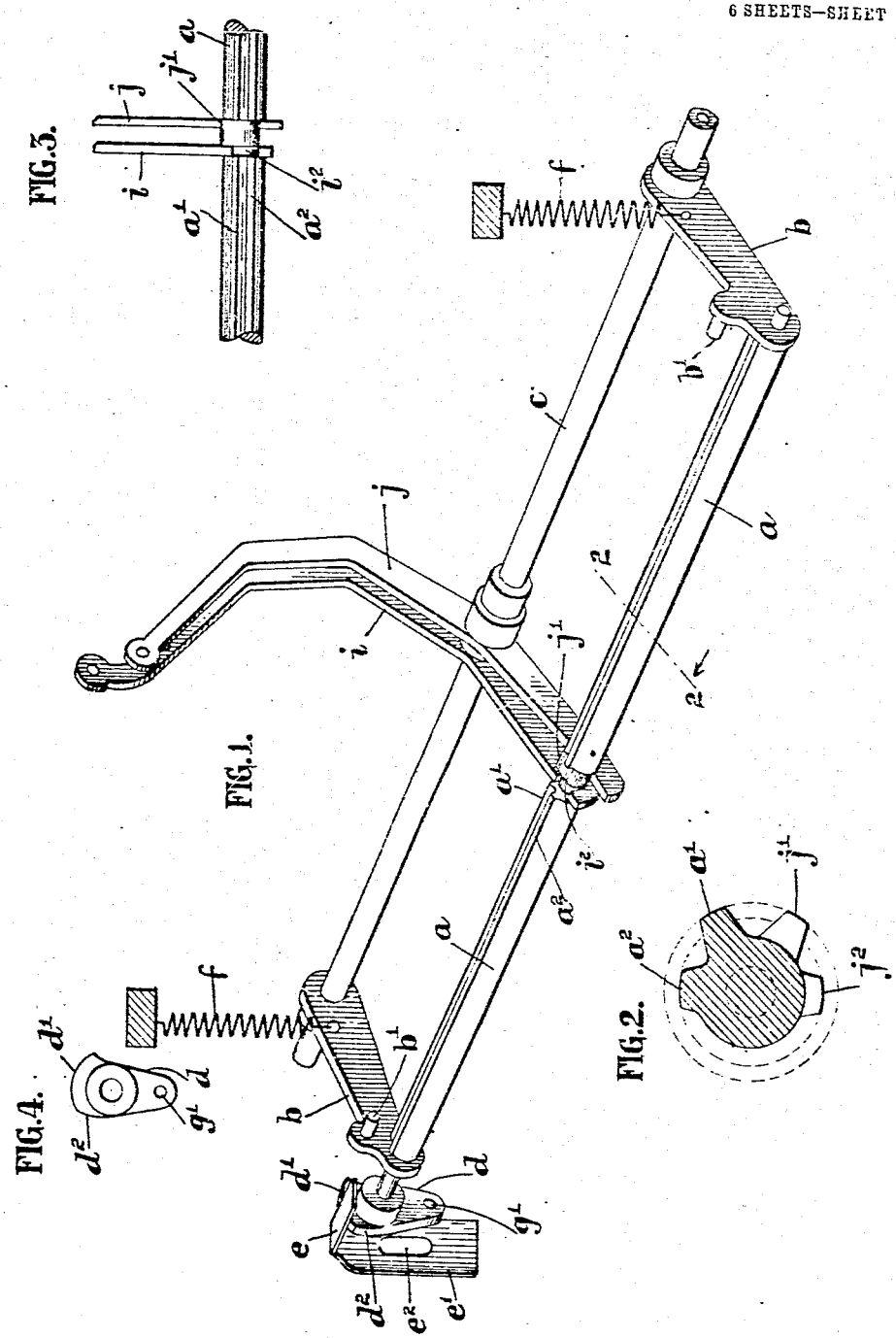

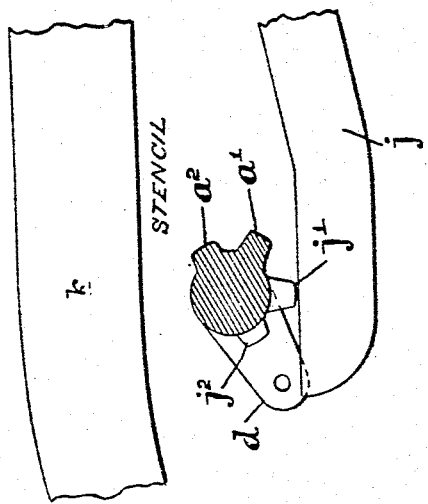
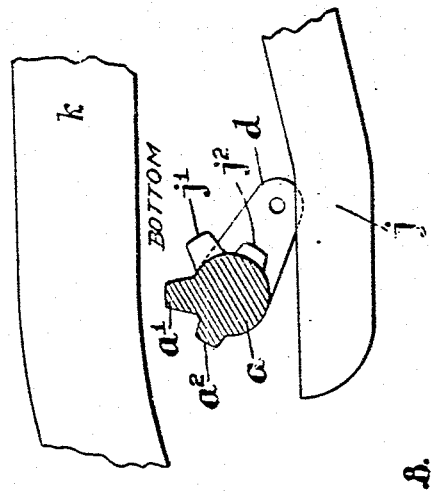
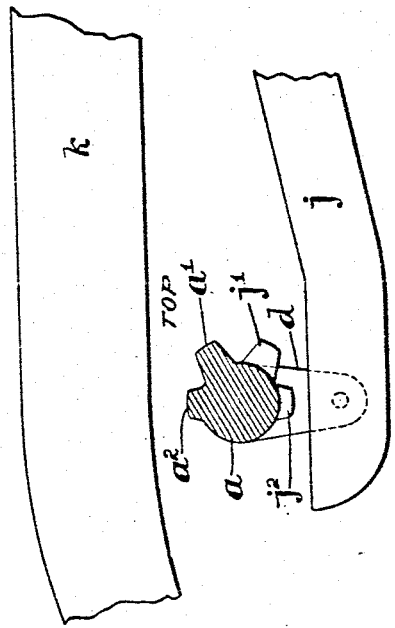
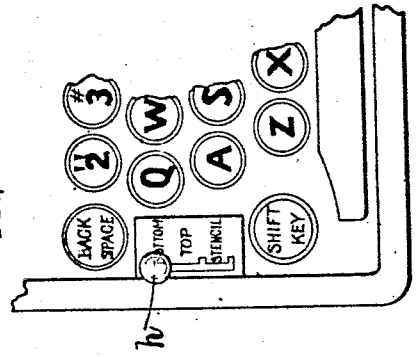

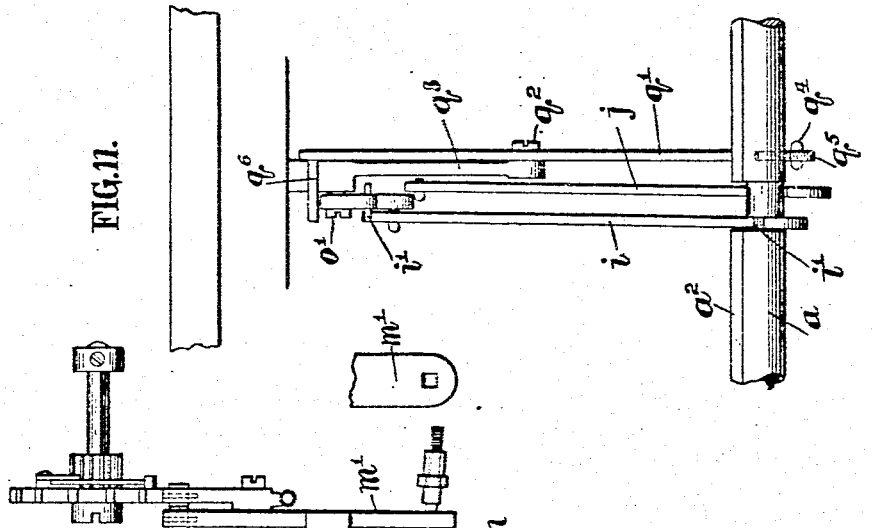
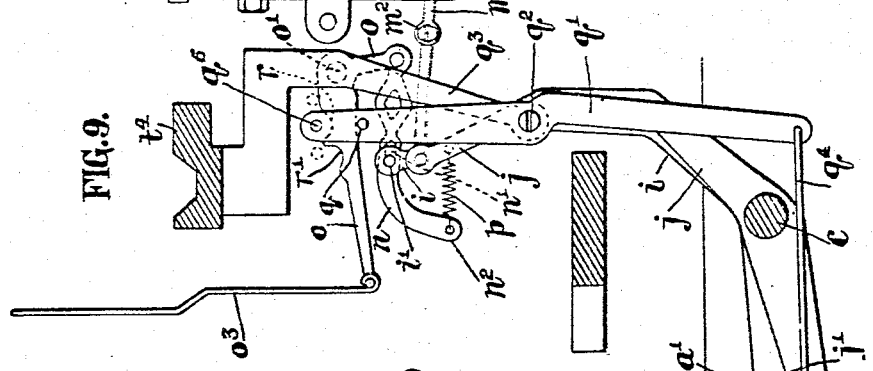
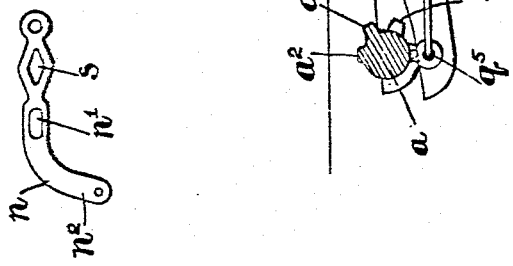

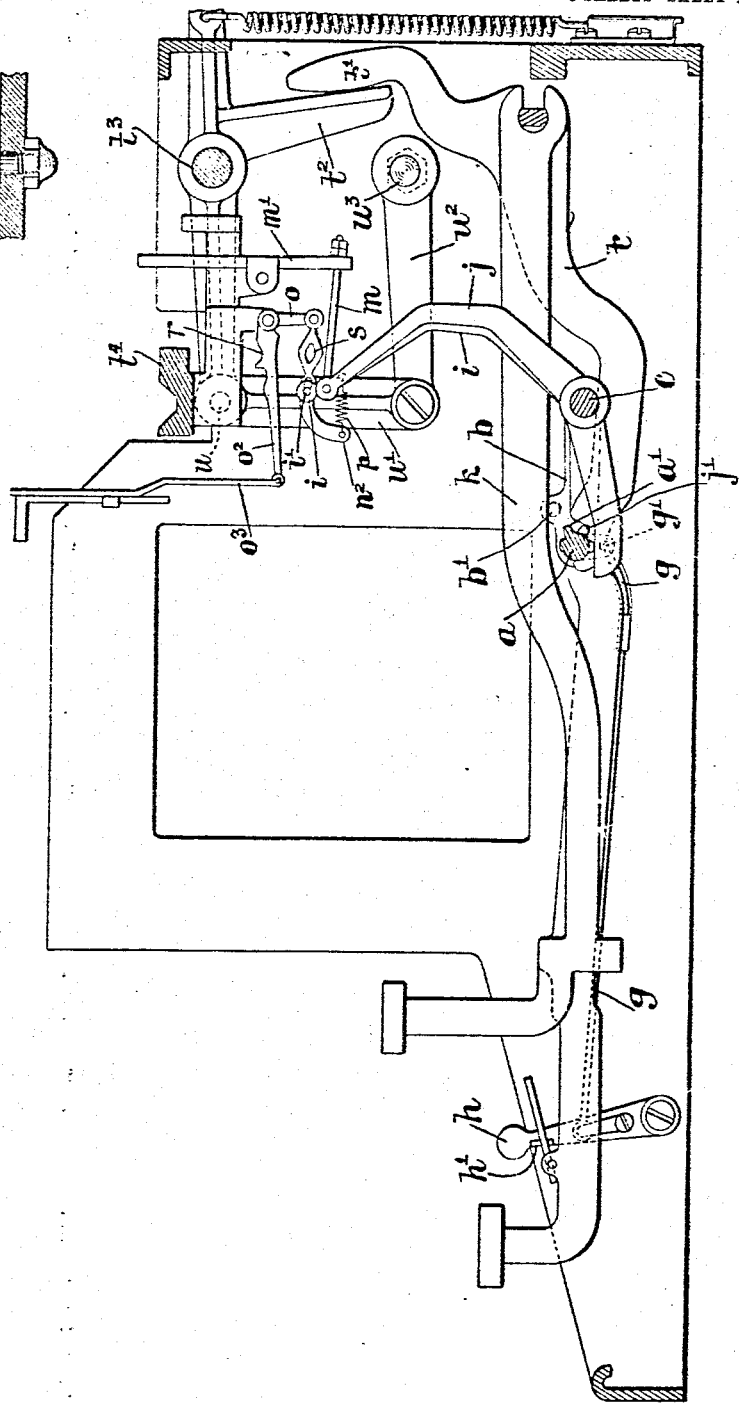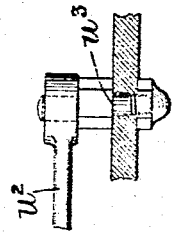

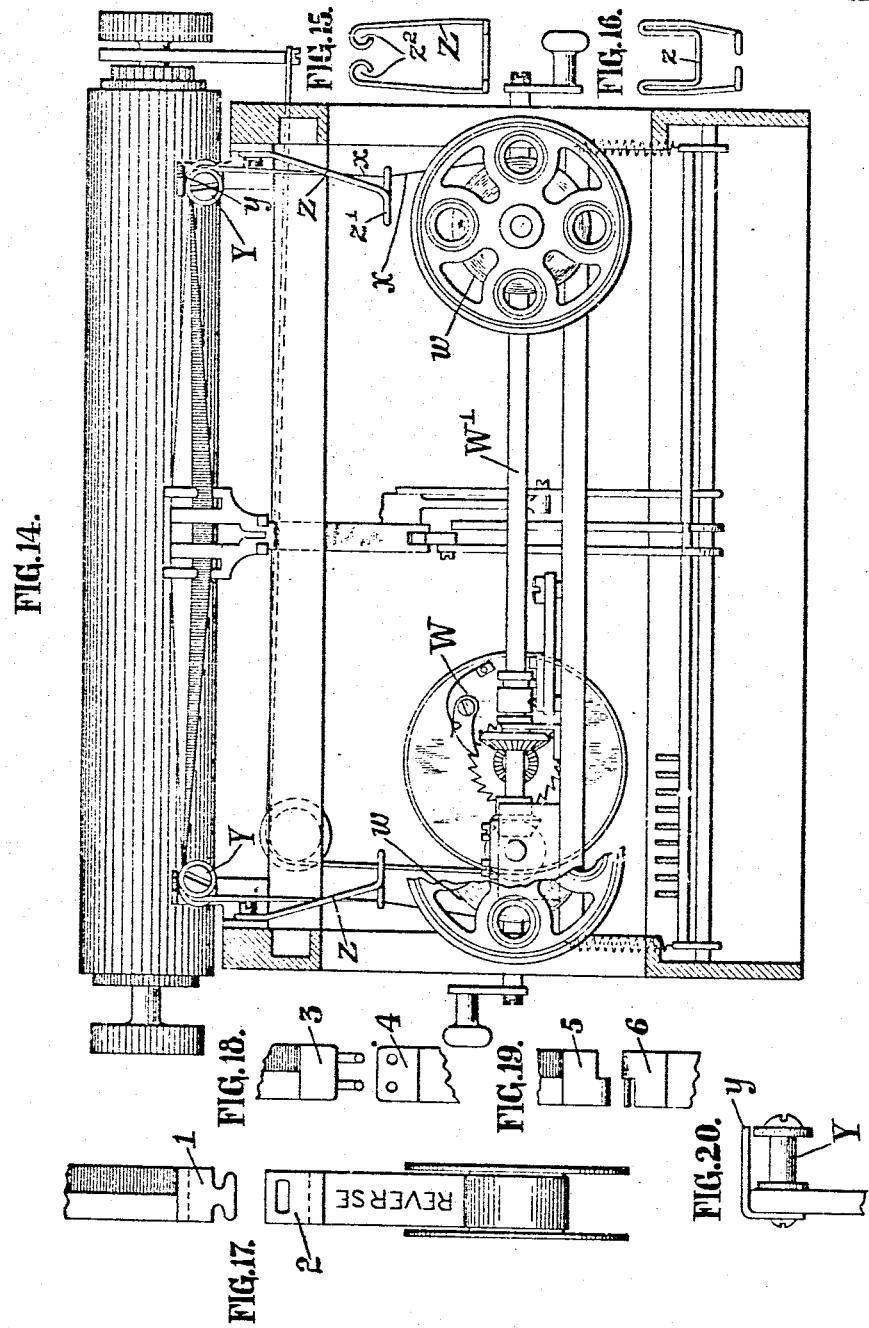

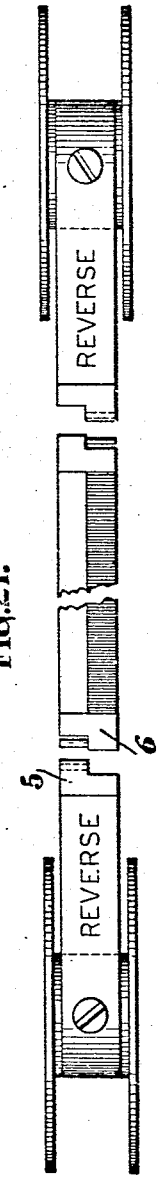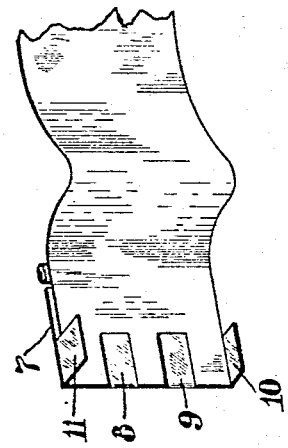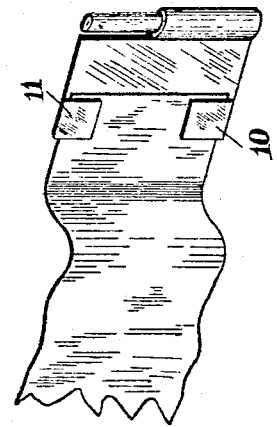

EDWARD B. HESS, OF NEW YORK, N. Y., ASSIGNOR TO ROYAL TYPEWRITER COMPANY, OF HOBOKEN, NEW JERSEY, A CORPORATION OF NEW JERSEY.

TYPE-WRITING MACHINE.

948,972.   Specification of Letters Patent.   Patented Feb. 8, 1910.

Application filed May 8, 1907. Serial No. 372,465.

*To all whom it may concern:*

Be it known that I, EDWARD B. HESS, a citizen of the United States, residing in the borough of Brooklyn, city and State of New York, have invented certain Improvements in Type-Writing Machines, of which the following is a specification.

The principal improvement in typewriting machines contemplated by this invention is a new mechanism for giving to a ribbon vibrating guide different ranges of movement to effect printing from different zones of the ribbon which may be of different colors and, if desired, also to avoid interposition of the ribbon at the printing point when stencil work is being made. The style of the machine to which this part of the invention relates is therefore a visible writing machine in which, at the moment of impact of the type against the platen, the ribbon is interposed to effect an impression upon the paper and immediately thereafter it moves away from the printing point to expose to view what has been printed. There are various styles of such machines and this invention is not restricted in its application to any particular machine of that kind.

Upon perusal of this specification, it will become obvious to those skilled in the art that the invention is in no wise dependent upon the mode of operating the type bars or upon other details of construction of a writing machine and that it is equally applicable to machines printing upper and lower case in which either the platen or type bar segment is shifted.

The primary point of novelty in this part of the invention is the provision of a bar or part, arranged transversely of the machine, operated on depression of the several finger pieces in the key board and so constructed or provided with means that at will of the operator different ranges of movement are imparted to it on depression of the finger pieces to effect through appropriate actuating devices different ranges of movement of the ribbon guide or vibrator. This bar or part is preferably the universal bar of the machine. If, for instance, the ribbon vibrator be connected by suitable levers with this bar, the zone of the ribbon most nearly adjacent the printing point will be moved into position to print when a small range of movement is imparted to the bar and when a greater range of movement is imparted to it there will, of course, be an increased amplitude of movement of the ribbon vibrator to bring a zone of the ribbon more remote from the printing point into printing position. Provision is made for timely and proper actuation of the escapement and also for an adjustment of the parts by means of which the ribbon is not projected to the printing point thereby adapting the machine to stencil work. The principles of construction by which these results may be accomplished and the mechanical details which experience has demonstrated to be practical and efficient are hereinafter set forth.

The invention is shown as applied to a front-strike, bar, key-lever, carriage shift machine, that being the general style of machine to which the invention has been first adapted by me.

The invention also comprises certain improvements relating to guides for the ribbon to and from the vibrator and the attachment of the ribbon to the ribbon bobbins.

In the accompanying drawings: Figure 1 is a perspective view showing the universal bar and escapement and ribbon vibrating levers operated thereby; Fig. 2, a cross section through the universal bar on the line 2, 2, of Fig. 1; Fig. 3, a top plan view of the central part of the universal bar showing the relation of the escapement and ribbon vibrating levers thereto; Fig. 4, a detail elevation of the cam plate attached to and rotating with the universal bar which latter is arranged and mounted to rock about its axis; Figs. 5, 6 and 7 are respectively detail views showing the relations of a key lever, universal bar and escapement lever for printing from the top or bottom zone of a two color ribbon, or for stenciling; Fig. 8, is a detail plan of one corner of the keyboard; Fig. 9, a detail longitudinal sectional view showing the universal bar and ribbon vibrating means; Fig. 10, a detail side elevation of a special form of link adapted to connect a bell crank lever to which the ribbon vibrator or guide is attached with the ribbon vibrating lever operated by the universal bar; Fig. 11, a front elevation showing some of the parts illustrated in Fig. 9; Fig. 12, a vertical longitudinal section through so much of a machine as is desirable to illustrate the invention; Fig. 13, a detail horizontal sectional view showing means for adjusting the front carriage supporting rail; Fig. 14, a transverse vertical sectional view through the machine; Figs. 15 and 16 detail views illustrating a guide for the ribbon as it leaves, or passes to, a bobbin; Fig. 17, a detail elevation showing a special means for attaching the end of a ribbon to bobbin; Figs. 18 and 19 show modified ways of attaching the end of a ribbon to a bobbin tape; Fig. 20, a detail view of an idler wheel over which the ribbon passes to or from its vibrating guide; Fig. 21 shows a slight modification of means for attachment of the ends of a ribbon to the bobbin tapes; and Figs. 22 and 23 illustrate one way in which the attaching device applied to the ends of the ribbon and bobbin tapes may be secured thereto.

The universal bar $a$ is mounted to turn in bearings in the ends of arms $b$ secured to a transverse shaft $c$ mounted to rock in bearings in the side plates of the machine. Fixed to the universal bar, preferably at one end,— the left hand end,— is a cam plate $d$ having cam surfaces $d'$, $d^2$ adapted to bear against a stop plate $e$ attached to or formed with a vertically arranged plate $e'$ provided with a vertical slot $e^2$ for adjustable attachment to the side plate of the machine. Springs $f$ applied at their lower ends to the arms $b$ and at their upper ends to fixed parts of the frame tend, by their reaction, to elevate the universal bar and maintain the cam plate $d$ in contact with the top stop $e$. A link $g$ (Fig. 12) applied at $g'$ to the cam plate $d$ below the axis of the universal bar extends forwardly and is attached to the side of a vertically disposed lever $h$ pivoted at its bottom and arranged adjacent the left hand side plate of the frame at the side of the keyboard. This lever has upon its inner side a lug $h'$ adapted to engage either of three notches at the side of a slot in a horizontally disposed plate (Fig. 8) which may be and preferably is marked with the words "Bottom", "Top" "Stencil". Adjustment of this lever operates, by means of link $g$, to place the universal bar and its cam plate $d$ in different angular positions. When the lever $h$ is engaged with the intermediate notch marked "Top" on the plate, the parts are in the position indicated in Figs. 1 and 7 and the top stop $e$ is in contact with the high surface of the cam face $d'$. If the lever be moved to the notch marked "Bottom" the universal bar $a$ is rocked about its axis by means of link $g$ the lower end of the cam plate $d$ being swung rearwardly, and the cam face $d'$ remains drawn up against stop $e$ by the springs $f, f$. This is the condition indicated in Fig. 5 of the drawings. When lever $h$ is drawn to the front and engaged with the notch marked "Stencil" the top stop plate $e$ is in engagement with the low cam face $d^2$, this condition being indicated in Fig. 6. These different positions of the cam plate cause two different planes of normal elevation of the universal bar.

Rigidly secured to rock shaft $c$ is a lever arm $i$ that extends upwardly in rear of shaft $c$ and forwardly under the universal bar being formed with an open notch or recess in which is seated a reduced circular portion $i^2$ of the universal bar. In close proximity to lever $i$ and mounted to loosely rock about shaft $c$ is an escapement operating lever $j$ that extends upwardly in rear of the bar and forwardly under the universal bar, that portion of the universal bar opposite the end of the lever being specially formed as hereinafter described. The universal bar is formed or provided with two parallel longitudinal ribs or projections of different heights, the higher one being marked $a'$ and the lower one $a^2$. These ribs or projections extend under all the key levers $k$.

Adjacent the cylindrical reduced portion $i^2$ of the universal bar and immediately opposite or above the end of the escapement operating lever $j$, the bar is formed with a reduced circular part of less radius than the circular part of the bar having two projections of different heights, the high one being marked $j'$ and the low one $j^2$. As will be seen in Fig. 2, the low rib $a^2$ is diametrically opposite the projection $j^2$, and the higher rib $a'$ on the bar is diametrically opposite a circular surface of the bar as is also the higher projection $j'$. The upper end of the escapement lever $j$ is connected by a link $m$ with the escape lever $m'$ and the upper end of the ribbon guide vibrating lever $i$ is connected to a link $n$ jointed to the downwardly extending short end $o$ of a bell crank lever pivoted at $o'$ on a downward projection from the carriage shift rail, and whose forwardly extending arm $o^2$ is jointed to the vertically disposed ribbon guide or vibrator $o^3$. The connection between the upper end of lever $i$ and link $n$ is effected by a pin $i'$ on the side of the lever entering a horizontal slot $n'$ in the link. A coiled spring $p$ having one end attached to lever $i$ and the other to the downwardly turned end $n^2$ of link $n$ tends, by its reaction, to move the link rearwardly moving the front end wall of the slot $n'$ against the pin $i'$ and holding vibrator or ribbon guide $o^3$ down, the parts being in the position indicated in Figs. 1 and 7. When a key lever, $k$, is depressed it makes contact with the rib $a^2$ of lower elevation on the universal bar and then carries the universal bar downwardly, the effect of which is to rock the upper end of the ribbon vibrator $i$ forwardly and move the upper zone of the ribbon to the printing point. When the key lever is released, springs $f$ and $p$ serve to return the parts to normal position. The projection $j^2$ on the universal bar opposite the end of the escapement lever is of such elevation as to engage that lever and effect the timely operation of the escapement. For convenience of description, two dotted circles,—one of the diameter of the rib $a'$ and the other of the diameter of the rib $a^2$,—have been placed upon Fig. 2. The key lever when depressed, the parts being in the position indicated in Figs. 1 and 7, moves through that portion of the diameter between the inner and outer dotted circles before engaging the rib $a^2$. If it is desired to print from the lower zone of the ribbon, a greater extent of movement of the ribbon guide is, of course, required and for that purpose the parts are shifted as described into the position shown in Fig. 5. When a key lever is depressed, it engages the higher rib $a'$ at that stage of its downward movement when it has reached the boundary of the outer dotted circle of Fig. 2 and therefore a correspondingly greater extent of movement of the universal bar is effected and, of course, a corresponding increase in the height to which the ribbon vibrator is effected. In this case, however, the escapement lever is now engaged by the cylindrical part of that reduced portion of the universal bar opposite the escapement lever and the parts are so proportioned, as will be apparent from the drawings, that the engagement of the escapement lever occurs at the same stage of depression of the key lever as it did when the parts were in the normal position shown in Fig. 7 for printing from the upper zone of the ribbon.

If it be desired to do stencil work, then the parts are adjusted, by means of the lever $h$, to the position indicated in Fig. 6 in which the superior elevation of the universal bar occurring because the top stop $e$ now rests upon the lower part $d^2$ of the cam has operated to carry the pin $i'$ to the rear wall of the slot $n'$ in link $n$, tension of spring $p$ being overcome since that spring can now draw the link $n$ rearwardly no farther because the forwardly extending arm $o^2$ of the ribbon guide bell crank is arrested by its bottom stop $q$. This stop is shown as a lateral pin in the side of a lever $q'$ pivoted at $q^2$, on the downward extension $q^3$ from the front rail of the carriage, and connected at its lower end by a horizontally disposed link $q^4$ with a radially projecting eye $q^5$ on the under side of the universal bar and the further function of which is described below. In this position of the parts, seen in Fig. 6, when a key lever $k$ is depressed, it moves through the diameter included between the outer dotted circle in Fig. 2 and the circular surface of the universal bar, before it engages the bar. The higher projection $j'$ is now immediately above the end of the escapement lever and consequently there is but very slight movement of the ribbon vibrating lever $i$ before the escapement is actuated. This movement is absorbed by the lost motion of pin $i'$ in the slot $n'$ of link $n$ and consequently the ribbon vibrator remains at rest. The movement of the radial eye $q^5$ forward in bringing the parts into the position shown in Fig. 6 has rocked the upper end of lever $q'$ rearwardly carrying the stop pin $q$ lying under the bell crank arm $o^2$ rearwardly and on account of the arc of movement somewhat downwardly causing the ribbon vibrator to be held, by reason of pressure of pin $i'$ against the rear wall of slot $n'$, in somewhat lower position than its normal position thereby insuring that the type will not strike the upper edge of the ribbon. The end of the lever $q'$ extends above the upper edge of the bell crank arm $o^2$ and is provided with a stop pin $q^6$ that acts as a top stop for that arm and is a positive limit to the upward throw of the ribbon guide. In the position last described, it will be seen that this top stop pin $q^6$ is substantially in engagement with the upper edge of the lever arm $o^2$ and positively prevents the ribbon guide from rising. In the central position of the lever $q'$ (shown in Fig. 9) when the parts are adjusted for printing from the upper or top zone of the ribbon, stop $q^6$ is in line above a recess $r$ in the upper edge of the lever arm $o^2$ positively preventing overthrow of the ribbon guide: and when the parts are in position for printing from the lower or bottom zone of the ribbon, as indicated in Fig. 5, the stop pin $q^6$ will be in the position indicated by the dotted circle to the left (Fig. 9),—that is immediately above a deeper recess $r'$ in the lever arm $o^2$ and acts to positively limit the upward throw of the vibrator. On the inner side of each arm $b$ carrying the universal bar are projecting pins $b'$ with which are to contact the side arms of the usual space bar located in the keyboard. To provide for adjustment in assembling, the link $n$ is slit and expanded as shown at $s$ (Fig. 10) so that its effective length may be increased by contracting the walls of the slit or decreased by expanding them. The link $m$ is preferably connected with the escapement lever $m'$ as follows: The link is made of rectangular or non-circular cross section and fits in a correspondingly shaped aperture in the lower end of the lever and has applied to its rear threaded end an adjusting nut. Further to avoid unnecessarily loose fit without friction of the link in the lever, the lever is preferably jointed as indicated at $m^2$. The escapement devices may be of any appropriate construction and description of them seems quite unnecessary.

In the machine illustrated, the platen, not shown, is to be shifted. In Fig. 8 is indicated the finger piece of a shift key lever which, in Fig. 12, is marked $t$. Its upwardly extended end $t'$, when the key lever is depressed, engages and swings forward an arm $t^2$ extending from the frame pivoted at $t^3$ that carries the front rail $t^4$ upon which the carriage runs. The ribbon vibrator bell crank $o$, $o^1$ is pivoted (Figs. 9 and 12) to a projection extending down from the rail and is, therefore, moved when the platen is shifted. The rail $t^4$ is pivoted at $u$ in the ends of the rocking frame and, at each side of the machine, has a downward extension $u'$ to the lower end of which is pivoted a rearwardly extending link $u^2$ pivoted on the side plate of the machine by an eccentric bearing $u^3$ thus permitting slight endwise adjustment of link $u^2$ to effect, in assembling the machine, close adjustment of the carriage rail $t^4$.

In Fig. 12, the bell crank $o$, $o^2$ is pivoted upon a short downward extension from the front rail of the carriage and the stop lever $q'$ is omitted; if used, the extension from the rail would be carried down sufficiently to provide a pivot for it in the general manner indicated in Fig. 9.

This invention relates also to the guiding of the ribbon to and from the ribbon vibrator, and to means for attachment of the ribbon to the tapes of the ribbon bobbins.

$w$, $w$, represent the ribbon bobbins; W a reversible ribbon feed mechanism; and W' is the usual winding shaft.

$x$ indicates the ribbon which passes over idlers Y mounted in brackets at the sides of the machine about in the horizontal plane of the ribbon vibrator and with their axes angularly disposed in lines that meet at a point in front of the machine. These guides serve to give the proper extent of turn or twist to the ribbon so that it will smoothly enter and leave the vibrating ribbon guide. To prevent disengagement of the ribbon from the idlers in the event of sufficient slack of the ribbon occurring, there is provided a horizontal guard plate $y$ overlying the idler and having a right angular end attached to the supporting bracket. To impose a slight tension upon the ribbon between each of the spools and its corresponding idler there has been provided a tension guide Z (Figs. 14 to 16). It is formed of wire bent upon itself at the middle into horizontally disposed U-shape as at $z$ and then the wire on each side of the U-part is carried backwardly a short distance along the sides thereof as indicated at $z'$ and then they incline upwardly their ends being formed with eyes $z^2$ to receive screws attaching them to the frame of the machine. The elasticity of these wire guides tends to carry the cross-bar of the U-part slightly inside of the line the ribbon tends to assume in passing from the bobbin to the idler. A slight tension is thereby imposed upon the ribbon. This general arrangement of ribbon bobbins and idlers is disclosed and claimed in an application filed by me November 15, 1905, Serial No. 287,489 and also in my application, No. 300,039, filed February 8, 1906 in which the identical arrangement thus far described is fully illustrated except that the tension guides similar to those Z above described are formed of sheet metal. The said application, No. 300,039, discloses also the same arrangement of ribbon feed and winding shaft that is illustrated in Fig. 14. Any appropriate feed and winding arrangement may be used and detail description is therefore unnecessary.

Fig. 17 shows, applied to the end of the ribbon a metal tip 1 having a T-head adapted to engage and disengage a slotted metal tip 2 secured to the tape of the ribbon bobbin.

In Fig. 18, the metal ribbon tip 3 has two parallel hooks adapted to engage apertures in the tip 4 secured to the bobbin tape.

In Fig. 19, the tip 5 applied to the end of the ribbon has the form of a hinge butt and the tip 6 applied to the bobbin tape has a hinge pintle to engage it. The arrangement shown in Fig. 21 is identical with that of Fig. 19 except that the hinged butt is upon the tip of the bobbin tape and the pintle upon the tip of the ribbon.

Figs. 22 and 23 show a means of attaching the tips, whatever may be the character of their interlocking devices, to the bobbin tape and to the ends of the ribbon and is as follows: A sheet metal plate 7 formed or provided with the interlocking device (which may be of the hinge butt and pintle form of Figs. 21 and 19 or such as those shown in Figs. 17 and 18 or of still other varieties) is provided with preferably two tongues 8, 9, extending from the edge of the plate in a direction parallel with the ribbon and with tongues 10, 11 arranged respectively at opposite sides of the plate and extending therefrom at right angles to the general direction of the ribbon or bobbin tape. This plate is applied to the end of the tape or ribbon. Then the tongues 8 and 9 are turned over upon it to clamp it as seen in Fig. 22. Then the ribbon or tape is laid over upon the tongues 8, 9, and the side tongues 10, 11 are turned down upon it as in Fig. 23. This makes a very firm, tenacious, simple and flat connection of the sheet metal tips with the ribbon or bobbin tape.

In my application filed November 30th, 1909, Serial Number 530,632 which is a division of my application filed November 15th, 1905, Serial Number 287,489 there is disclosed and claimed ribbon vibrator mechanism wherein the vibrator has imparted to it a plurality of extents of movement, and adjustable coöperating stop devices for limiting the respective movements of the vibrator, and hence such subject matter is not claimed herein, the claims herein being directed to special constructions not disclosed in said application, and also not disclosed in applications of mine relating to the same general subject matter viz: application filed July 24th, 1907, Serial Number 385,276, and application filed April 16th, 1909, Serial Number 490,243.

I claim:—

1. A vibrating ribbon guide, a universal bar, an operating connection between the two by which the guide is operated from the universal bar, escapement devices, also operated by the universal bar, and means under control of the operator common to all the character printing keys whereby one extent of movement may be given to the universal bar to effect printing from any type from one zone of a ribbon and to actuate the escapement, and a different extent of movement to effect printing from any type from another zone of the ribbon and to actuate the escapement.

2. A vibrating ribbon guide, a universal bar, an operating connection between the two by which the guide is operated from the universal bar, escapement devices also operated by the universal bar, and means under control of the operator whereby one extent of movement may be given to the universal bar to effect printing from one zone of a ribbon and to also actuate the escapement, a different extent of movement to effect printing from another zone of the ribbon and to also actuate the escapement devices, and a minimum extent of movement serving to cause actuation of the escapement devices only.

3. A vibrating ribbon guide, a universal bar, a lever actuated by the universal bar and connected with the ribbon vibrating devices by a loose or lost motion connection, and means whereby one extent of movement may be given to the universal bar to effect a certain range of movement of the ribbon guide and a less extent of movement given to the universal bar and taken up by said lost motion connection so that no movement is imparted to the ribbon vibrating devices.

4. A vibrating ribbon guide, a transverse bar, an operating connection between the two by which the guide is operated from the universal bar, key levers, ribs of different heights upon the universal bar with which the key levers are adapted to contact, properly placed projections also of different heights upon said bar, an escapement lever operated upon such projections and means for partially rotating the bar.

5. A ribbon vibrating guide, a rotatable transverse bar capable of different degrees of lateral movement to effect different ranges of vibration of the ribbon guide, an operating connection between the guide and bar, means for holding said bar in different normal rotary positions to effect in each position uniform movement of the ribbon guide and means for at will rotating and changing the normal rotary position of the bar so that another range of movement is imparted to it to effect a different range of movement of the ribbon guide.

6. A ribbon vibrating guide, a rotatable transverse bar capable of different degrees of lateral movement to effect different ranges of vibration of the ribbon guide, an operating connection between the guide and bar, means for holding said bar in different normal rotary positions to effect in each position uniform movement of the ribbon guide and means for at will rotating and changing the normal rotary position of the bar so that another range of movement is imparted to it to effect a different range of movement of the ribbon guide, escapement devices, a lever for operating them and means whereby on depression of a finger piece said bar in its movement from either of said normal positions effects also operation of the escapement devices.

7. A ribbon vibrating mechanism adapted to effect printing from either zone of a polychrome ribbon and to hold the ribbon away from the printing point for stencil work, comprising a vibrating ribbon guide, a bell crank lever for operating it, a link connected to one arm of the bell crank lever, an operating lever, a pin-and-slot connection between the link and the last named lever and a spring connected to said lever and to one end of the link and serving, when the apparatus is adjusted to print from either zone of the ribbon, to hold the pin against one wall of the slot and, when adjusted for stencil work, to permit the pin to pass to the other wall of the slot.

8. A visible writing machine, comprising a platen, a ribbon vibrator that normally holds the ribbon to one side of the line of print, finger keys adapted on their depression to act upon a universal bar, a universal bar provided with adjustable means common to all the character printing keys and under control of the operator whereby the universal bar may have different extents of movement on depression of the finger keys, and an operating connection between the universal bar and the ribbon vibrator.

9. A visible writing machine, comprising a platen, a ribbon vibrator that normally holds the ribbon to one side of the line of print, finger keys adapted on their depression to act upon a universal bar, a universal bar provided with adjustable means common to all the character printing keys and under control of the operator whereby the universal bar may have different extents of movement on depression of the finger keys, an operating connection between the universal bar and the ribbon vibrator and escapement devices actuated by the universal bar whenever the said finger pieces are depressed.

10. A universal bar, adapted to rock about its axis and having ribs of different height, a ribbon vibrator actuated by it, and means for imparting different extents of movement to the bar to correspondingly change the amplitude of movement of the vibrator.

11. In a visible writing machine, a platen, a ribbon vibrator, finger pieces, a rotatable universal bar having ribs of different height, devices acting, on depression of the finger pieces, upon the universal bar, means under control of the operator for rotating the universal bar to adjust the normal position of its surfaces upon which said devices act to thereby, at will, cause the bar to have different extents of movement when finger pieces are depressed, and an operating connection between the universal bar and the ribbon vibrator.

12. A visible writing machine comprising a platen, a ribbon vibrator, key levers having finger pieces, a universal bar arranged transversely to the key levers and operated thereby, an operating connection between the universal bar and ribbon vibrator, escapement devices, an operating connection between said devices and the universal bar, means for changing the normal relative relation of the universal bar and key levers so that different extents of movement will be imparted to the bar and means for maintaining a uniform extent of movement of the escapement operating connection.

13. In a visible writing machine, a ribbon vibrator, a universal bar having a plurality of faces of unequal height, key levers acting upon such faces of the universal bar, means under the control of the operator serving to determine which face of the universal bar the key levers will act upon, and an operating connection between the universal bar and ribbon vibrator.

14. In a visible writing machine, a ribbon vibrator, a universal bar, an operating connection between the two, means for operating the universal bar on depression of the finger pieces of the machine, means under control of the operator whereby the universal bar may be adjusted so as to have different ranges of movement on depression of the finger pieces, ribbon vibrator stop devices, an operative connection between them and the universal bar whereby they are adjusted to the vibrator by the adjustment of the universal bar, escapement devices and an operative connection between them and the universal bar acting to operate said devices whenever the universal bar is operated by any of said finger pieces.

15. A vibrating ribbon guide, a universal bar, an operating connection between the two by which the guide is vibrated by the universal bar, means adjustable at will of the operator for governing the extent of movement of the universal bar on depression of the finger pieces of the machine, and an adjustable ribbon guide stop device operatively connected with the universal bar to be adjusted correspondingly with the extent of movement of said bar.

16. A vibrating ribbon guide, a universal bar adapted to rock about an axis and having surfaces of different radius, means acting, on depression of the finger pieces of the machine, to move the universal bar laterally, means for rocking the bar to bring a desired surface thereof into operative relation to said means to thereby effect the desired extent of lateral movement of the bar, and an operative connection between the universal bar and the ribbon guide.

17. A vibrating ribbon guide, a universal bar adapted to rock about an axis and having surfaces of different radius, means acting, on depression of the finger pieces of the machine, to move the universal bar laterally, means for rocking the bar to bring a desired surface thereof into operative relation to said means to thereby effect the desired extent of lateral movement of the bar, an operative connection between the universal bar and the ribbon guide, escapement devices and an operative connection between them and universal bar.

18. A vibrating ribbon guide, a universal bar, an operating connection between the two by which the guide is vibrated by the universal bar, means adjustable at will of the operator for governing the extent of movement of the universal bar on depression of the finger pieces of the machine, an adjustable ribbon guide stop devices operatively connected with the universal bar to be adjusted correspondingly with the extent of movement of said bar, escapement devices and an operative connection between them and the universal bar.

19. A vibrating ribbon guide, an escapement lever, a series of key levers, a universal bar located below the key levers, adapted to rock about an axis and having surfaces of different radius adapted to be operated upon by the key levers and other surfaces of unequal radius adapted to operate upon the escapement lever, means whereby the operator may rock the universal bar and an operative connection between the universal bar and the ribbon guide.

20. A vibrating ribbon guide, an escapement lever, a series of key levers, a universal bar located below the key levers, adapted to rock about an axis and having surfaces of different radius adapted to be operated upon by the key levers and other surfaces of unequal radius adapted to operate upon the escapement lever, means whereby the operator may rock the universal bar, an operative connection between the universal bar and the ribbon guide, adjustable stop devices acting to positively limit the movement of the ribbon guide and an operative connection between said devices and the rocking universal bar.

21. In ribbon mechanism, a ribbon vibrator made of sheet metal and having on each side of its longitudinal center two separated arms of unequal length, the space between which constitutes a ribbon slot, the longer one of which arms is bent over upon itself to form a stop to prevent the ribbon moving edgewise out of said slot.

22. The combination of a shifting platen, a ribbon vibrator, adjustable means for moving the vibrator through different distances, adjustable stop means for limiting the respective distances through which the vibrator may be moved, a link connection between said adjustable means and said stop means whereby the latter is adjusted by movement of the former, and means for adjusting said adjustable means independently of the printing operation of the machine.

23. The combination of a shifting platen, a ribbon vibrator, a vibrator operating lever mounted to shift with the platen, adjustable means for moving said lever through different distances, adjustable stop means acting directly on said lever to limit the respective distances through which it may be moved, and means for coincidently adjusting said adjustable means and said stop means independently of the printing operation of the machine.

24. In ribbon vibrator mechanism the combination of a ribbon vibrator, a vibrator operating lever connected thereto, adjustable lever operating means adapted to move to said lever through different distances, correspondingly adjustable stop means acting directly on said lever to limit the respective distances through which it may be moved, and means whereby said lever operating means and stop means are adjusted independently of the printing operation of the machine.

In testimony whereof, I have hereunto subscribed my name.

EDWARD B. HESS.

Witnesses:
JOHN M. LEE,
LILLIE F. BROWNING.